(12) United States Patent
Calmer (10) Patent No.: US 8,171,708 B2
(45) Date of Patent: *May 8, 2012

(54) STRIPPER PLATE

(76) Inventor: Marion Calmer, Alpha, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/481,976

(22) Filed: Jun. 10, 2009

(65) Prior Publication Data

US 2009/0249759 A1    Oct. 8, 2009

Related U.S. Application Data

(63) Continuation of application No. 12/082,469, filed on Apr. 11, 2008, which is a continuation of application No. 10/376,657, filed on Feb. 28, 2003, now Pat. No. 7,373,767.

(60) Provisional application No. 60/364,813, filed on Mar. 15, 2002.

(51) Int. Cl.
*A01D 45/02* (2006.01)

(52) U.S. Cl. ........................................ 56/62

(58) Field of Classification Search ............ 56/34, 62, 56/33, 126–130, 330; 460/134
See application file for complete search history.

(56) References Cited

U.S. PATENT DOCUMENTS

| | | | |
|---|---|---|---|
| 730,671 A * | 6/1903 | Luce | 56/62 |
| 1,429,168 A * | 9/1922 | Scott | 56/130 |
| 2,575,120 A * | 11/1951 | Peel | 56/185 |
| 2,616,236 A * | 11/1952 | Hartley | 56/34 |
| 2,934,877 A * | 5/1960 | Fowler | 56/34 |
| 3,462,928 A * | 8/1969 | Schreiner et al. | 56/104 |
| 3,517,490 A * | 6/1970 | Mathews | 56/13.5 |
| 3,705,485 A * | 12/1972 | Toomer | 56/330 |
| 4,233,804 A * | 11/1980 | Fischer et al. | 56/104 |
| 4,377,062 A * | 3/1983 | Slattery | 56/14.3 |
| 4,445,314 A * | 5/1984 | Gust | 56/126 |
| 4,845,930 A * | 7/1989 | Dow | 56/113 |
| 5,060,464 A * | 10/1991 | Caron | 56/62 |
| 5,282,352 A * | 2/1994 | Schoolman | 56/62 |
| 5,680,750 A * | 10/1997 | Stefl | 56/62 |
| 5,704,202 A * | 1/1998 | Calmer | 56/106 |
| 5,775,076 A * | 7/1998 | Mossman | 56/119 |
| 5,787,696 A * | 8/1998 | Wiegert et al. | 56/104 |
| 7,373,767 B2 * | 5/2008 | Calmer | 56/95 |

* cited by examiner

*Primary Examiner* — Alicia Torres
(74) *Attorney, Agent, or Firm* — Hamilton Law, PC; Jay R. Hamilton; Charles A. Damschen (57) ABSTRACT

A stripper plate for use with a corn head row unit includes a front portion and a rear portion. The front portion is substantially flat such that the lateral surface of the front portion is parallel to the ground surface. The rear portion is integrally formed with the first portion and is beveled downward toward the ground surface. The interface between the front portion and the rear portion may be a gradually beveled area wherein the downward slope of the stripper plate increases along its length from the front thereof to the rear thereof.

5 Claims, 10 Drawing Sheets

STRIPPER PLATE

Applicant states that this utility patent application claims priority from U.S. patent application Ser. No. 12/082,469 filed on Apr. 11, 2008 and is a continuation of said utility application, which was a continuation of U.S. patent application Ser. No. 10/376,657, filed Feb. 28, 2003 now U.S. Pat. No. 7,373,767, which claimed priority from Provisional Pat. App. Ser. No. 60/364,813 filed on Mar. 15, 2002, all of which are incorporated by reference herein in their entireties.

FIELD OF THE INVENTION

This invention relates to corn harvesting machinery, specifically the corn picking row unit of the corn head. The corn head contains several row units. Each row unit contains a row crop divider, a row unit hood, gathering/conveying chain(s), two stripper plates, two stalk rolls, a row unit frame, and a gearbox. The gearbox powers the row unit for gathering corn plants and for stripping, separating and conveying ears of corn from the corn plant.

BACKGROUND OF THE INVENTION

Figures 1, 1A:
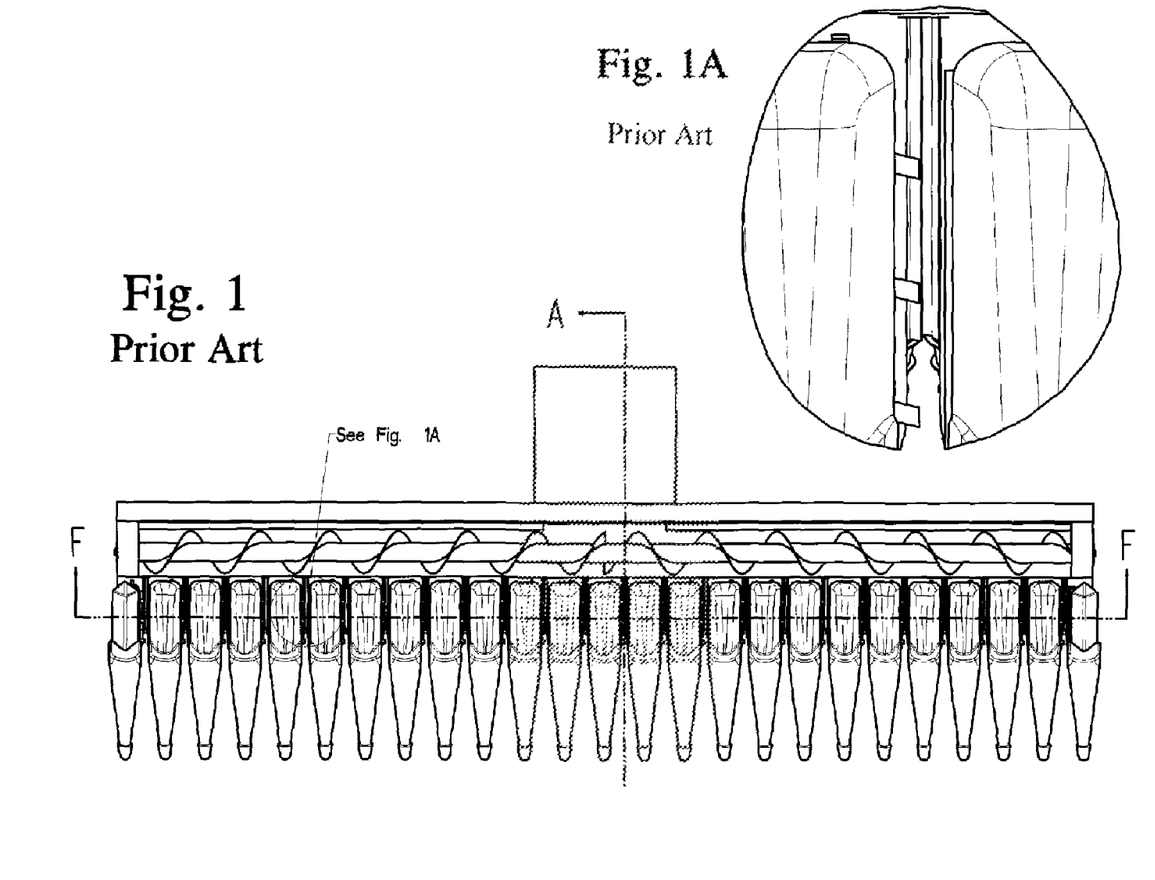
FIG. 1—is a top view of a corn head which contains a cross auger, a feeder house, a frame, and multiple row units of the prior art.
FIG. 1A—is an exploded view of a portion of one row unit of FIG. 1 of the prior art.

As shown in FIG. 1, corn heads are provided with several row crop dividers for retrieving, lifting, and directing the rows of corn stalks toward their respective ear separation chambers.

Figure 2:
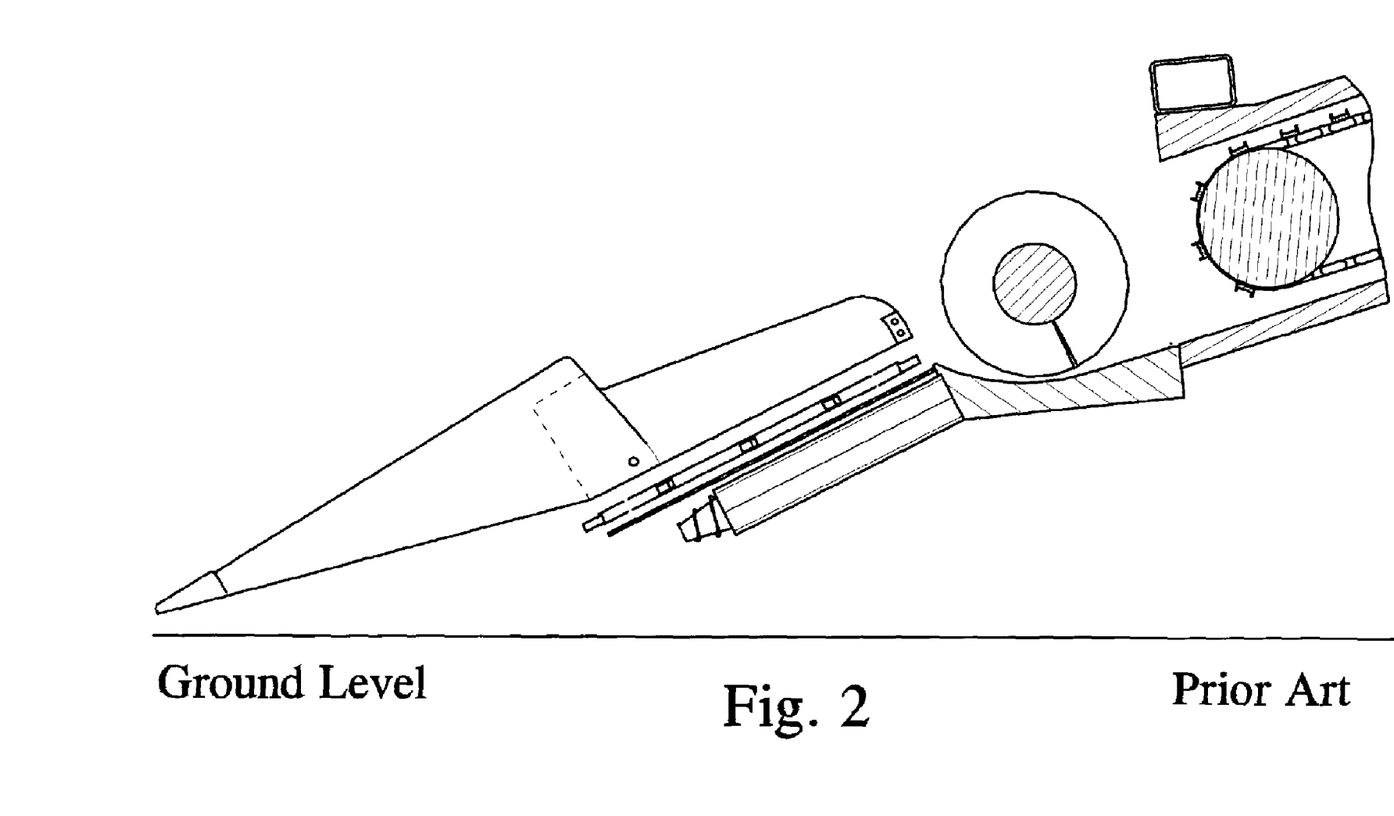
FIG. 2—is sectional view A-A of one row unit, the cross auger, the trough, the feeder house, and its conveyor chain of FIG. 1.

As shown in FIG. 2, these crop dividers in combination with the gathering chain(s) and stripper plates assist the crop from near ground level into the ear separation and conveying chambers. Stripper plates further center the corn plant between two stalk rolls located beneath the stripper plates.

Figure 3:
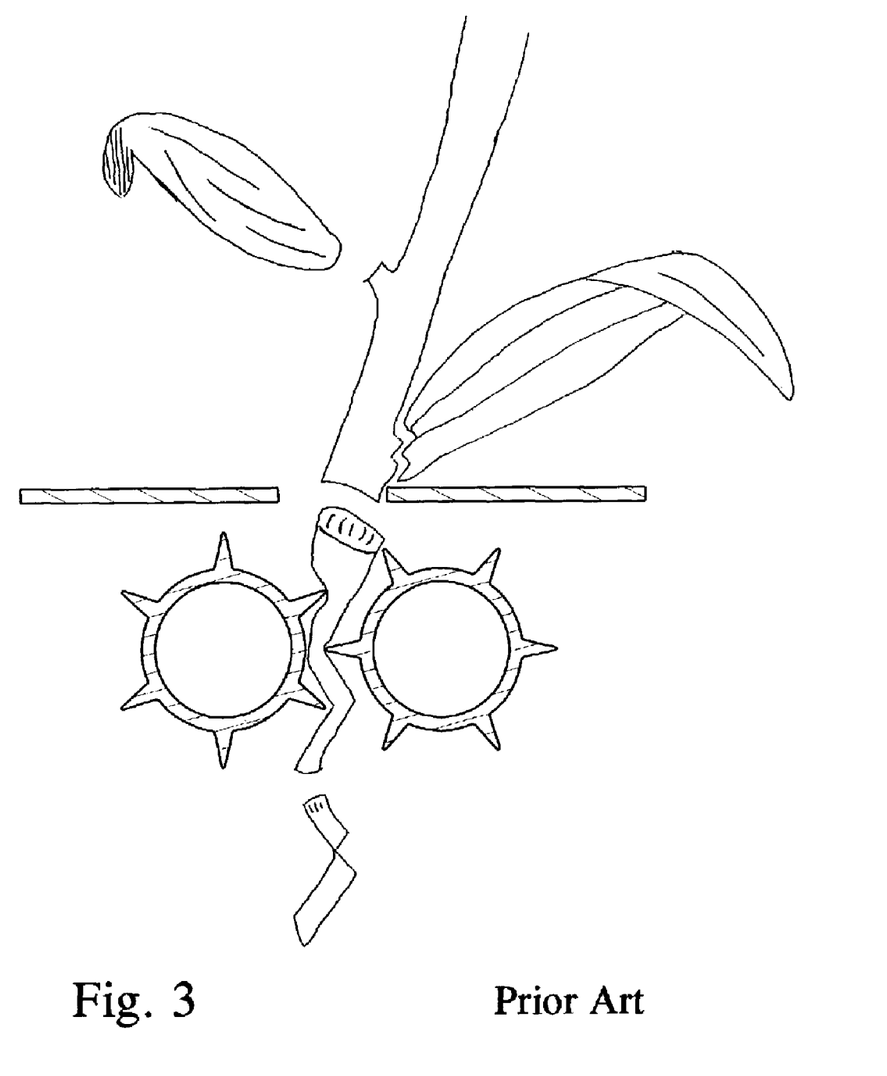
FIG. 3—is sectional view F-F of FIG. 1 of highlighting only the stalk rolls and stripper plates of one row unit of the prior art engaged with a corn plant.

These stalk rolls, as illustrated by FIG. 3, are powered by the gearbox. As the stalk rolls rotate, the flutes on the stalk rolls pinch and pull the corn stalks downward. Two stripper plates located above the stalk rolls and on both sides of the corn row are spaced wide enough to allow the corn plant to pass between them but narrow enough to retain the ears of corn which contain grain. This causes the ears of corn to be separated from the corn plant as it is pulled rapidly between these stripping plates. The stalk rolls continue to rotate ejecting the unwanted portions of the corn plant below the ear separation chamber thereby returning them to the field. The ears of corn are then transferred by the gathering/conveying chain(s) into the next conveying system for delivery to the combine for ultimate threshing and separation of the corn kernels from the corncob, silks, and husks.

In the past thirty years, three external factors have impacted corn harvesting: (1) Environmentally friendly residue management rules mandate that the farmer keep a certain percentage of crop residue on the surface of the land to prevent soil erosion. (2) Yields have doubled through improved genetics, fertilization, populations, and row spacings. (3) Harvesting machines are larger with increased horsepower, capacity, ground speed and utilize corn heads with more row units.

These three factors in combination require that modern corn head row units: (1) Increase the speed of ear separation. (2) Ensure that the corn plant is not severed from its roots system. (3) Increase the speed at which ears are conveyed out of the row unit. (4) Increase the speed at which corn stalks are ejected from the row unit. (5) Retain minimal amounts of mote (material other than ears) in the heterogeneous material being delivered to the combine for threshing.

The performance of previous row units, as shown in FIG. 2, was limited in down corn for two reasons: 1) The front portion of the row unit covers were tall causing any unattached mass of tangled plants to stall when sliding up this steep inclined plane. 2) The current design does not allow the distance between the gathering chain and the row unit covers to be minimized. This distance hinders engagement of the mass of unattached tangled plants with the gathering chain paddles. The rear height of the prior art corn head row unit cover's single largest plane was more than fifty percent (50%) of the front height. For example, the Case IH metal rear row unit cover front height of the single largest plane was 11.625 inches. The rear height of this plane was 6.5 inches which is equivalent to an almost fifty-six percent (56%) ratio. Gathering chain paddles impart force to the mass of corn stalks in the row unit or on the row unit covers to propel them to the corn head cross auger for further conveyance.

In FIG. 1A prior corn head row units were limited by gathering chain(s) utilizing eight short paddles. These paddles did not adequately move the ears out of the row unit at high operating speeds due to large amounts of ear slippage because the ear of corn is taller than the paddle. Another factor causing ear slippage is that the paddles are too close together, therefore not allowing adequate time for the ear to fall in between the paddles during high-speed operation.

In FIG. 3, some row units of the prior art have stripper plates utilizing one flat surface for gathering and stripping ears. This limited performance because this surface doesn't emulate the shape of the arched portion of the bottom side of the leaf area causing unnecessary leaf detachment and retention. Some previous stripper plates utilized one-beveled surface for both gathering and stripping. This limited performance by hindering the flow of ears between the spirals of the nose cone of the stalk roll and the bottom side of the beveled stripping edge. This caused ears to wedge and plug the row unit.

Previous row units were limited because the rotating directional vanes or spirals on the helical nose cones were interrelated causing lateral whipping of the corn plant. In FIG. 3 attempts at increasing ear separation speed were made by increasing rotational speed of the stalk rolls. This was unsuccessful because the stalk roll flutes of the same length rotating at high speeds act like a solid rotating cylinder and do not allow the individual flutes to engage the corn stalk. Thus the corn stalk is repelled and stalls without entering the corn stalk ejection area of the stalk rolls. This is also sometimes referred to as an eggbeater effect. This stall allows the rotating flute edges to lacerate the corn plant. When the gathering chain paddle passes above the stripper plates and engages this stalled plant, it will break or sever the plant prior to ear separation. This stall also causes ear separation to take place near the opening of the row unit and allows loose ears to tumble to the ground thereby becoming irretrievable.

In FIG. 3 one major manufacturer's stalk rolls utilize six flutes which inter-mesh and overlap. When this type of stalk roll engages the corn stalk, the flutes alternately apply opposing force. This fluted design causes at least three problems which are described in FIG. 3: (1) The corn plants are violently tossed from side to side causing premature separation of loosely attached ears, thereby permitting the ear to fall to the ground and become irretrievable. (2) The corn stalk snaps at a node causing long unwanted portions of the stalk and leaves to stay attached to the ear and remain in the row unit. This eventually creates a pile of trash or fluff in front of the cross-auger and feeder house. This problem is compounded as the number of row units per corn head is increased. (3) The corn stalks are cut-off prior to ear separation. This is sometimes referred to as a scissor effect.

Another major manufacturer's stalk rolls utilize four adjustable non-meshing flutes with two adjustable nose bearings. Frequent adjustment is required because the leading edge(s) of the flutes wear rapidly increasing stalk roll to stalk slippage and eventually stalk hair pinning over row unit frames. Nose bearing adjustment is necessary because row unit frames fatigue, stretch or bend.

As shown in FIG. 3, it has been an objective of some prior art stalk rolls with knife edged flutes to simultaneously chop up or shred the corn stalks while returning them to the field. This allows faster decomposition of the crop residue and decreases the plugging of tillage tools. The detached crop residue washes, blows or rapidly decomposes so that there is no protection for the soil. Thereby leaving it exposed to wind and water erosion. It has now been determined that this type of crop residue management is not environmentally friendly.

Corn heads of the prior art utilize bolt on, non-adjustable tall end dividers. These end dividers plug in down corn.

SUMMARY OF THE INVENTION

The present invention contains an ear separation chamber which is the area between the row unit covers and above the stripper plates and extends through all the zones. It designates at least four (4) interrelated overlapping zones with separate functions and purposes within each row unit. The combination of zones, relationships and sub-functions improves the performance of the corn head and combine by allowing better material flow through the row unit, reducing congestion mote levels through the row unit, conveying systems and the combine, thereby improving combine speeds and efficiencies. The four (4) current interrelated overlapping zones are the Alignment, Entry, Ear Separation and Post-Ear Separation Plant Ejection Zones.

This invention also provides for variable circumferential speeds. There are at least three critical circumferential speed ratios related to ground speed for optimum high efficiency harvesting. This invention provides that the three circumferential speed ratios are interrelated and effective row unit designs must recognize and incorporate these varied speed ratios to ensure corn plant(s) remain vertical or lean slightly toward the corn head upon engagement. Harvesting corn plants in this manner promotes ear separation in the targeted Ear Separation Zone and away from the front of the row unit. Targeting ear separation in this zone, and manner, reduces losses from ears tumbling out of the corn head row unit and onto the ground thereby becoming irretrievable.

The three critical speed ratios are: 1) Combine ground speed to row unit horizontal gathering/conveying chain speed. The gathering/conveying speed must be the same as or faster than the ground speed. 2) Combine ground speed to stalk roll transport vane horizontal speed. 3) Combine ground speed to row unit vertical ear separation speed. The vertical ear separation speed (sometimes referred to as vertical stalk speed) must be the same as or faster than the ground speed. However, the maximum vertical stalk speed before ear separation is the speed at which the ears of corn are damaged within the row unit. This is sometimes referred to as "butt-shelling". Each of these critical speed ratios constrains the operating speed of each zone described herein. Operating outside the critical speed ratio constraints within each zone produces sub-optimal performance. Obeying all the critical speed ratios, as required by high speed, high yield and or down corn harvesting operations, requires the effective circumferential speed and interaction of the multi-length, multi-angled, multi-vaned stalk rolls described in each in zone to vary while accomplishing the functions described in each zone.

The Alignment Zone

The purposes of this zone are to align, direct and gather the corn plant for conveyance to the Reception Zone with the corn ear intact and positioned for recovery with minimal mote. The entire zone is shown in view B-B of FIGS. 6, 7, 8 and FIG. 4A.

Figures 4, 4A:
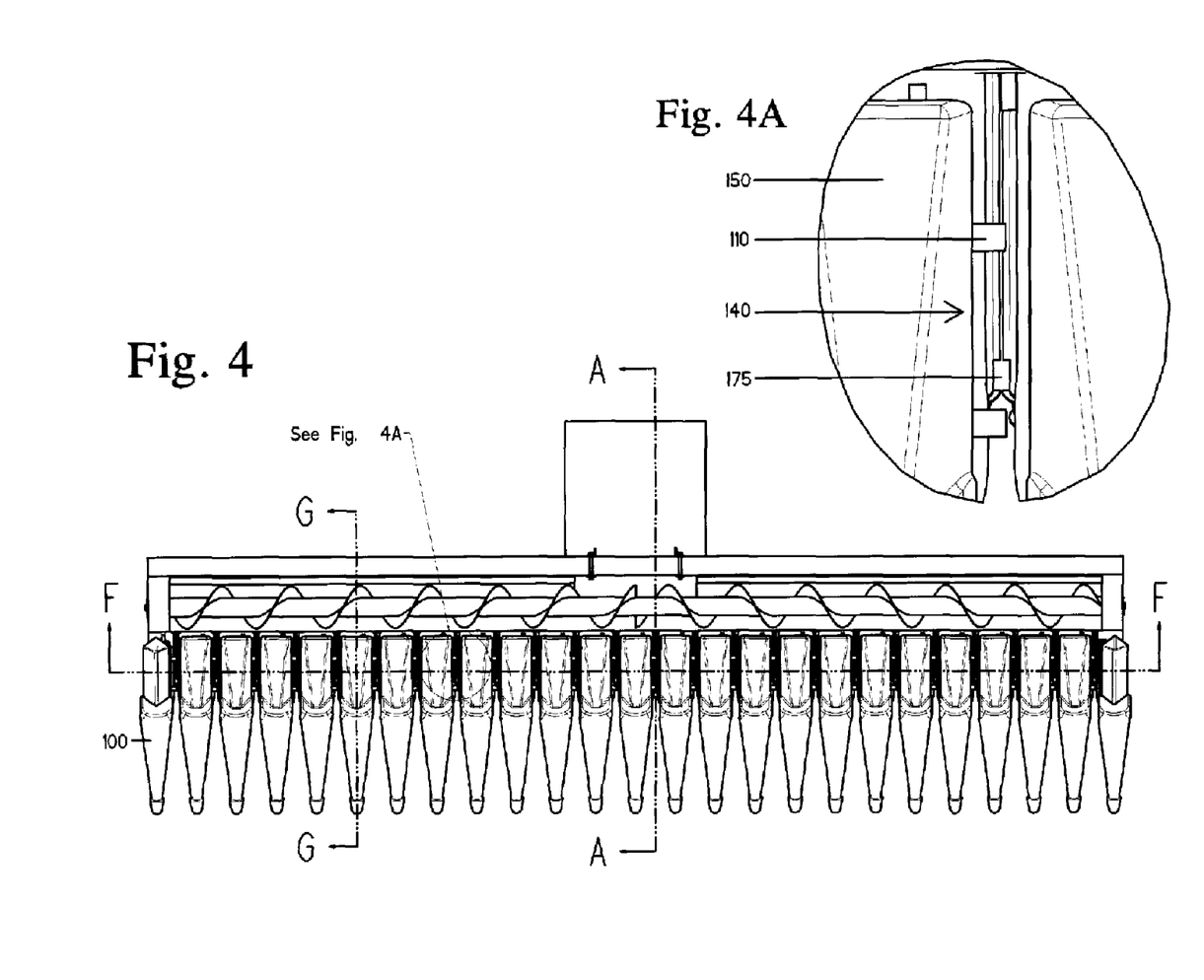
FIG. 4—is a top view of a corn head incorporating row units of this invention.
FIG. 4A—is an exploded view of a portion of one row unit of FIG. 4.
Figure 6:
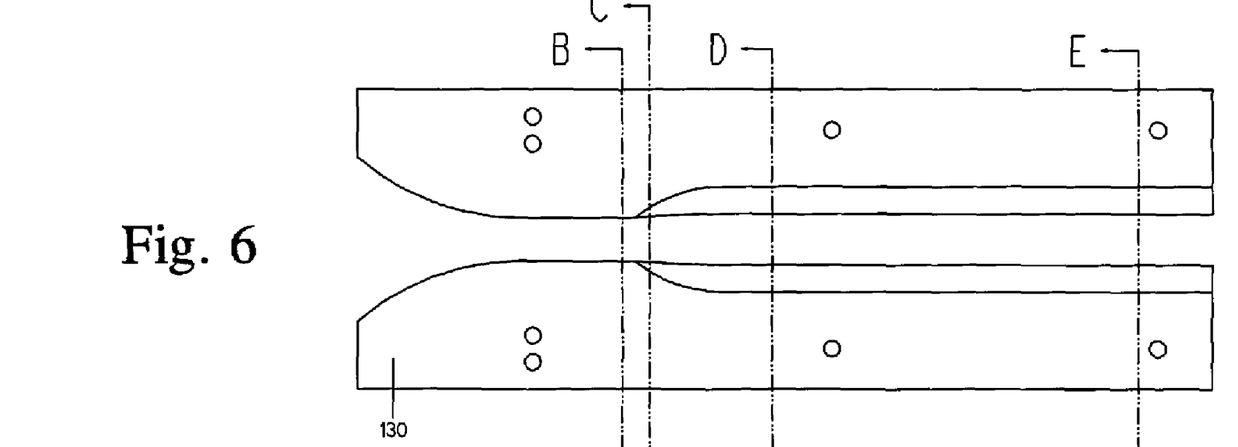
FIG. 6—is a top view of the ear stripping plates of the present invention with sectional lines.

FIG. 4A shows the improved row unit with three improvements to the gathering/conveying chain paddles (or lugs): 1) The number of gathering chain paddles is reduced providing a larger conveying chamber thereby reducing ear slippage and improving engagement between the ears and paddles. This allows more detached ears to fall into the enlarged conveying chamber. Thereby, increasing the conveying efficiency of the chain and decreasing the number of non-engaged ears in the separation chamber during the ear separation process. 2) The size of the gathering chain paddles is increased. Taller paddles reduce ear slippage and retain more ears. Additionally, in down corn, ear separation does not always occur at the targeted location causing loose airborne ears to be tossed wildly about the ear separation chamber. 3) The approach angle of the paddles is increased. Increasing the angle of the taller paddles increases the gathering aggressiveness of the chains when retrieving down corn stalks from near ground level into the row unit. This combination of improvements creates an enlarged and more aggressive conveying chamber for improving the gathering/conveying chains retrieval capacity and efficiency. FIG. 6 illustrates the invention's improvement of the stripper plate configuration. In the Alignment Zone, the stripper plate has flat surfaces to reduce the tendency of the ears that are being retrieved from near ground level to wedge or torpedo below the stripper plates.

The Entry Zone

The primary purpose of this zone is to control entry of the corn plant into the stalk rolls. This zone is shown in view C-C of FIGS. 6, 7 and 8. The rate at which corn stalks are accepted into the row unit controls harvesting speed. The prior art teaches that to increase the rate of entry, the rotating speed of the stalk roll must be increased. However, increasing the rotational speed of the stalk roll creates an "egg-beater" effect. This stalk roll will not engage the corn stalk because no opening exists by which the contact surface of the flute may contact or grab the stalk of the corn plant. If the stalk of the corn plant is not grabbed, the stalk stalls in the row unit. Increasing rotational speed within this section of the row unit amplifies this weakness of the prior art. Stalk stall allows the rotating flute edges to lacerate the corn plant. This stall also causes the corn plant to lean away from the row unit and ear separation to take place near the opening of the row unit that allows loose ears to tumble to the ground thereby becoming irretrievable. The present invention solves this problem by reducing the effective circumferential speed of the stalk rolls to allow entry and engagement. The present invention accomplishes entry and engagement by first contacting the corn plant stalk with rotating transport vanes located on the helical nose cone at the entry area to the stalk roll flutes. The rotating transport vanes may be either timed or non-meshing, so as to provide positive material flow in tough, damp, or high speed harvesting conditions as indicated in FIG. 8, view B-B. The rotating transport vanes also center the corn plant in the ear separation chamber. Next, the invention incorporates a revolving window or windows, comprising multi-length flutes with shorter opposing flutes, within the Entry Zone, as shown in FIG. 8, view C-C. The revolving window within the stalk roll opens to allow entry of the stalk. A revolving window or a plurality of windows is envisioned. The inventor herein describes the preferred embodiment to have two revolving windows per one complete revolution of the stalk roll. The rotating transport vanes lock the stalk into the revolving window. The entire perimeter of the stalk is then pinched by the longer flute for increased engagement between the multi-length, multi-fluted, stalk roll and the corn stalk as shown in FIG. 9. Increased engagement thereby increases the effectiveness of the zones within the ear separation chamber promoting the occurrence of rapid and clean ear separation within the Ear Separation Zone.

The present invention provides that the stalk rolls can be mounted either in a cantilevered or non-cantilevered manner.

The Ear Separation Zone

The primary purpose of this zone is to separate the ear from the plant and retain it. The objective of the stalk rolls in this zone is to pull the stalk through the stripper plates while maintaining the integrity of the stalk. The maximum vertical stalk speed allowed is such that minimal damage to the ear occurs. The present invention is shown in view D-D of FIGS. 6, 7 and 8. However, as best shown in FIG. 9, this invention provides that the non-meshing flutes of the stalk roll be timed and opposite with minimal clearance so that as one flute edge begins to pull the corn stalk down the opposing flute edge pulls the corn stalk down at a point on the horizontally opposite side thereof. This balanced pinching action reduces lateral corn plant whipping. When the corn plant is whipped, the stalk can dislodge and toss the ear from the stalk or prematurely break or sever. The balanced pinching action allows the stalk roll to evenly pull the stalk down so that the stripper plate may rapidly separate the ear from the stalk in the Ear Separation Zone.

As shown in view D-D of FIG. 6 and FIG. 9, in this zone the present invention uses a stripper plate that has a rounded or contoured surface to emulate the arched under side of the corn leaf with two positive effects. The emulation of the shape allows the corn leaf to stay attached to the corn stalk reducing the level of mote retained in the chamber. This shape also improves separation of the husk from the ear of corn further reducing the level of mote in the chamber. As indicated in FIG. 9, this invention also provides that the stalk roll flutes and stripper plates be closely adjacent to reduce the amount of mote retained in the ear separation chamber in the event that stalk separation takes place before ear separation. Stalk separation occurs when the stalk separates from itself. This occurs when the strength of the connection point of the ear shank is stronger than the stalk itself.

The Post-Ear Separation Plant Ejection Zone

Figure 7:
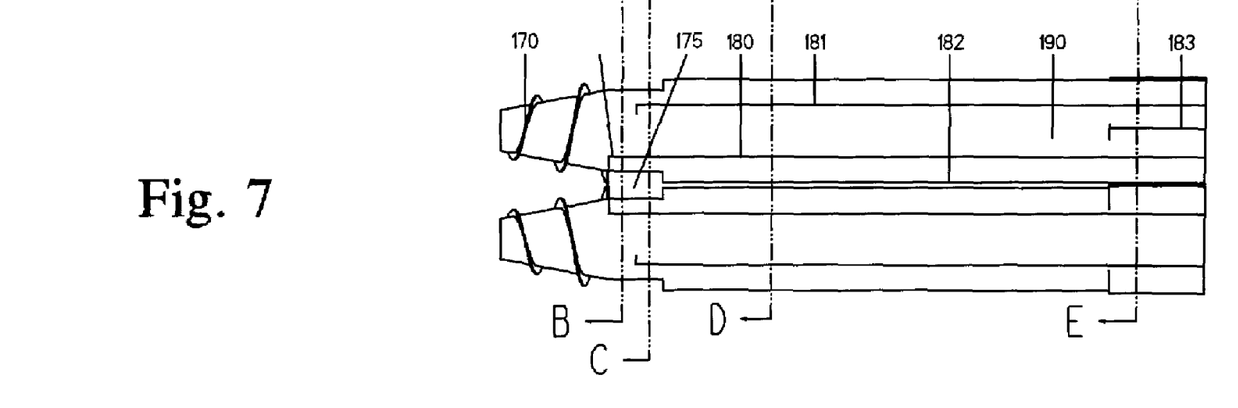
FIG. 7—is a top view of the stalk rolls of the present invention with sectional lines.
Figure 8:
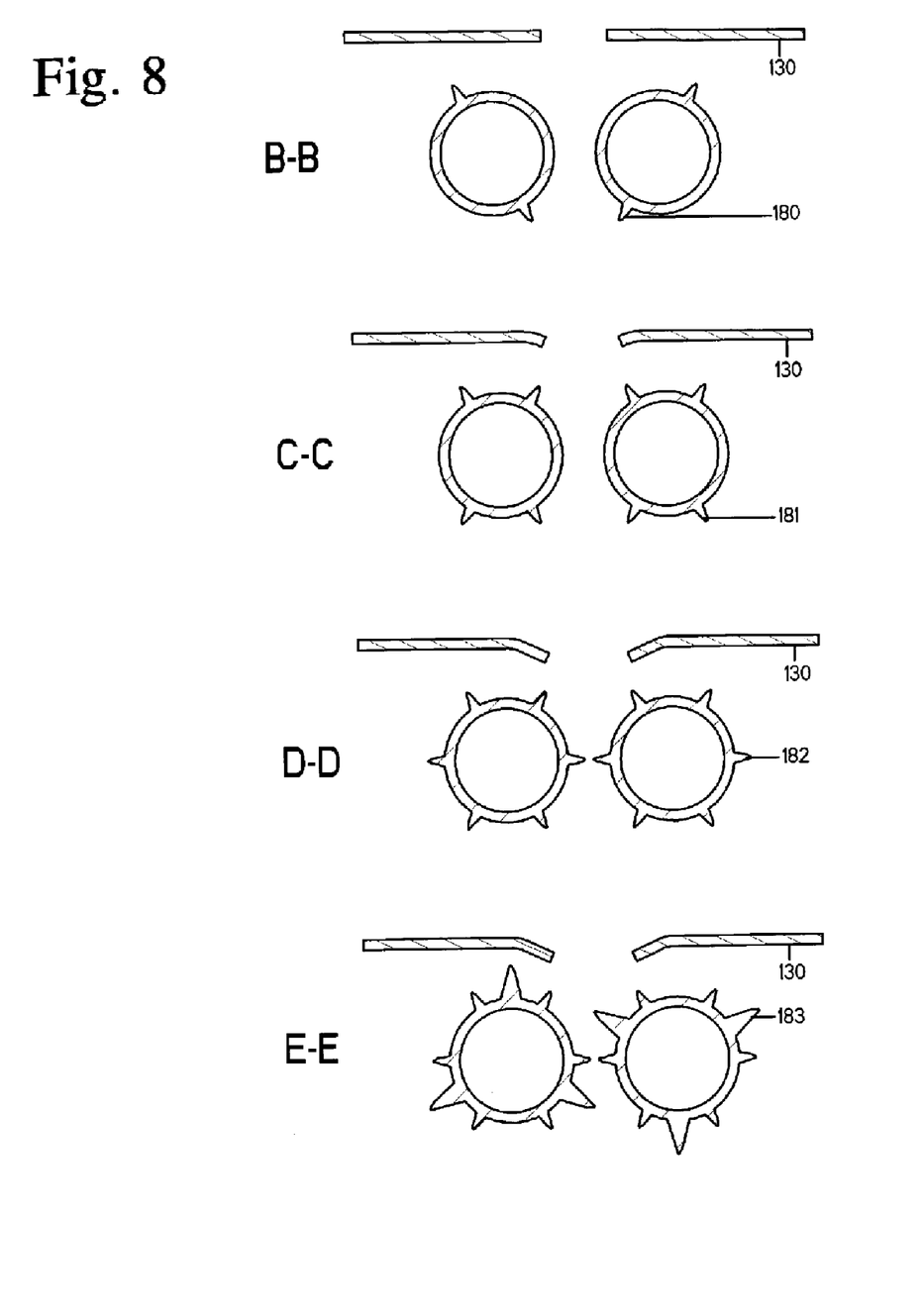
FIG. 8—is sectional views B-B, C-C, D-D, and E-E of FIGS. 6 & 7.
Figure 9:
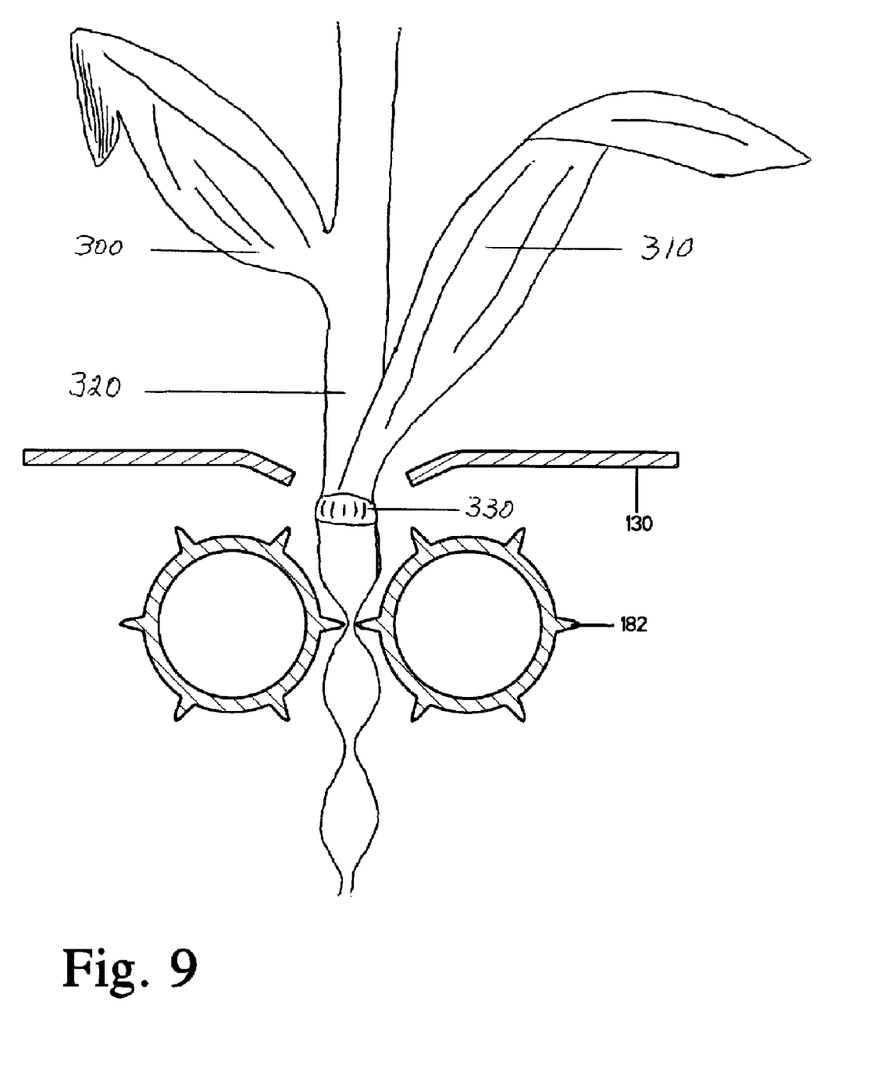
FIG. 9—is sectional view D-D of FIG. 8 with a corn plant engaged with the stalk rolls and stripper plates of present invention.

View E-E of FIGS. 6, 7 and 8 shows the configurations of the Post-Ear Separation Plant Ejection Zone. The primary purpose of this zone is to rapidly eject the stalk from the row unit to minimize interference between mote and ears of corn. No specific speed ratio controls the operating speed of this zone. After ear separation, increasing stalk ejection speed effectively reduces mote entering the threshing (kernel separation) area of the combine thereby increasing threshing efficiency and capacity. The primary changes incorporated by the invention in this zone are the increase in circumferential speed of the stalk rolls and the low row profile unit covers. This invention provides that within this zone, the stalk roll flutes can be both meshing and non-meshing so as to create a high speed clean out zone. The stalk rolls may also be aerodynamically designed to create a suction effect of unattached airborne mote from the ear separation chamber thereby returning this material to the field.

Figure 5:
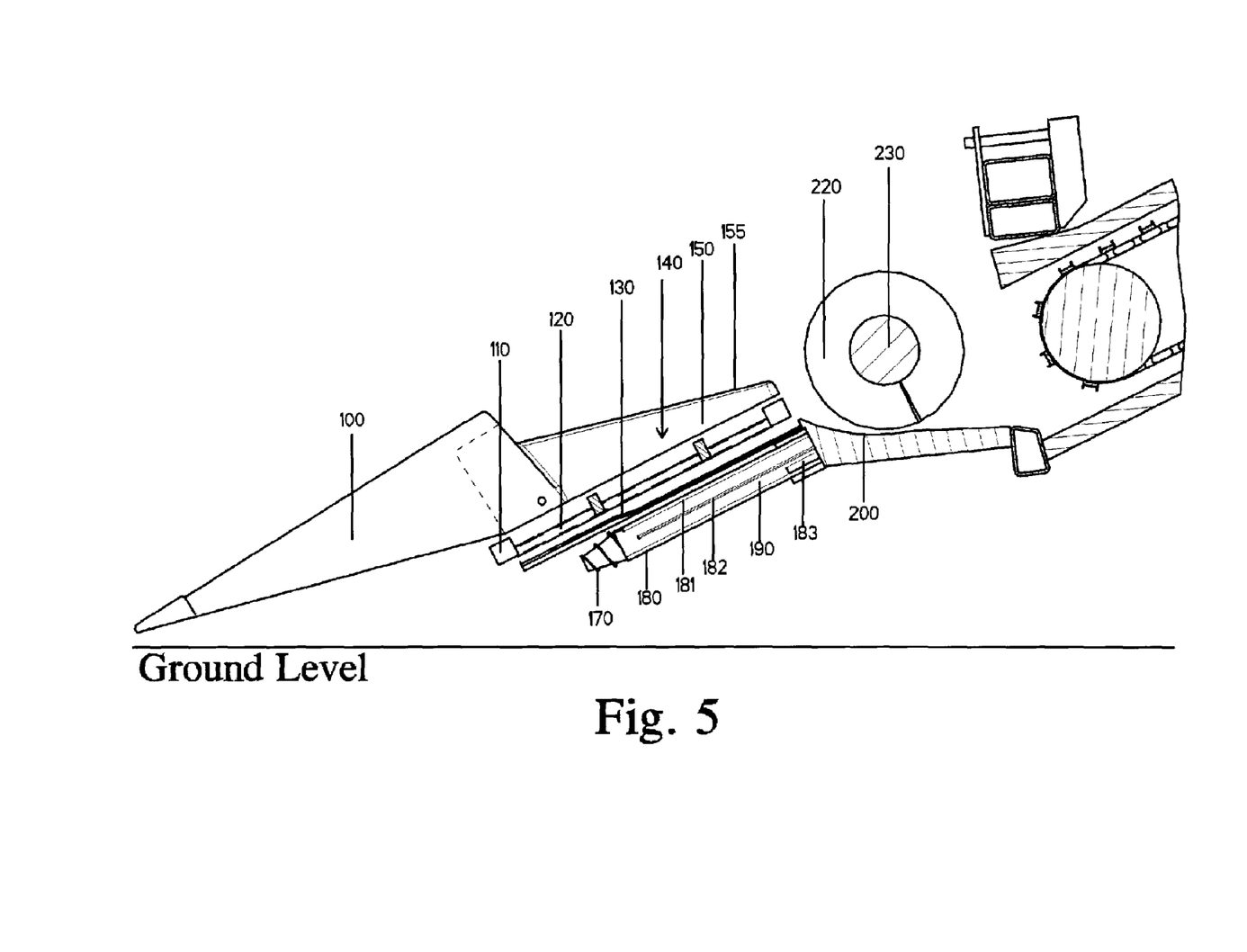
FIG. 5—is sectional view A-A of FIG. 4 incorporating this invention and components of pending patent application Ser. No. 09/827,563 Strategic Spatial Realignment for Attaching cornheads to combines.
Figure 10:
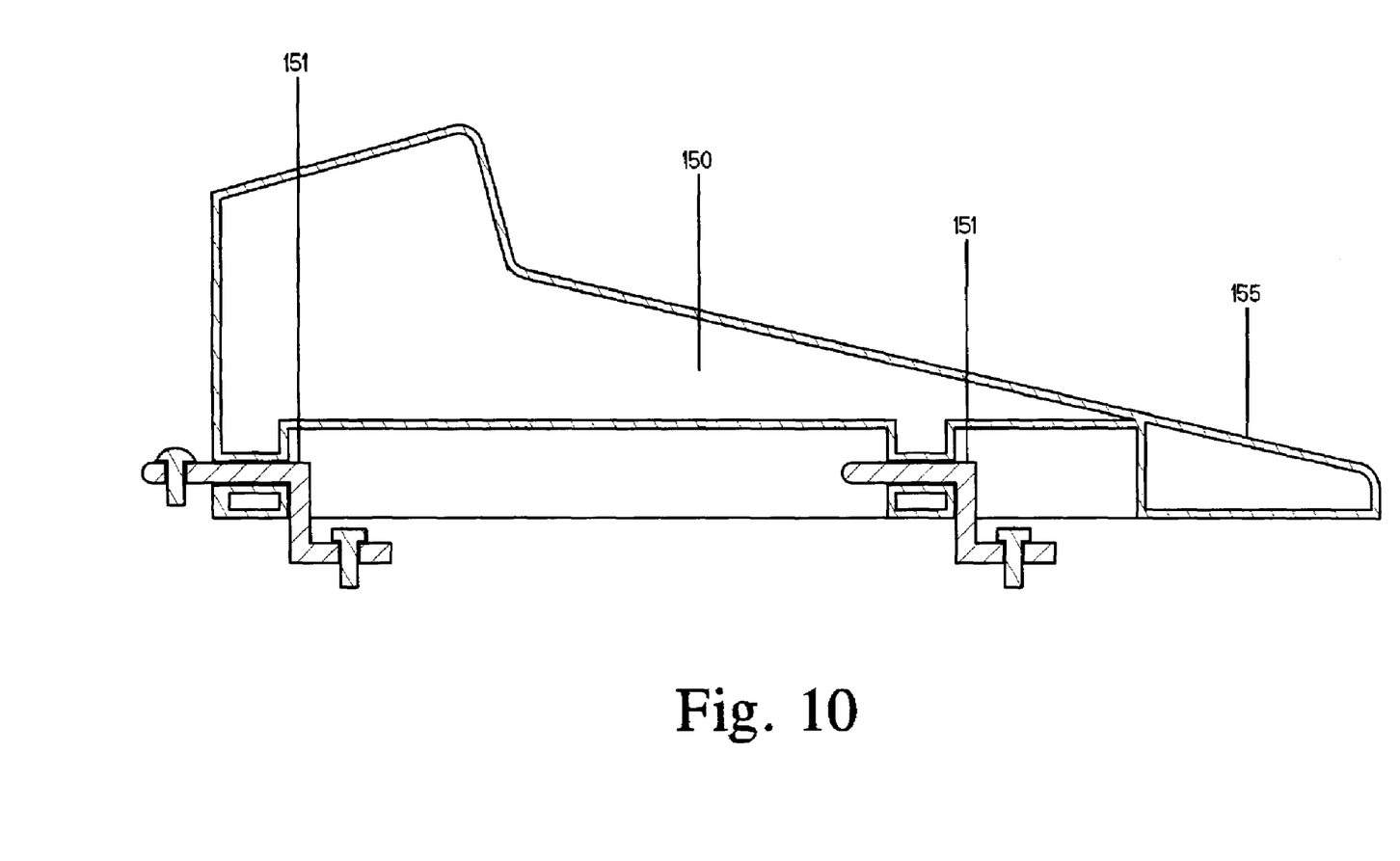
FIG. 10—is sectional view G-G of FIG. 4 showing only the improved row unit cover(s) and necessary mounting hardware of the present invention.

The low profile row unit covers are found in the Post Ear Separation Zone but improve performance in all the zones. FIGS. 5 and 10 highlight the low profile row unit cover and the necessary improved mounting hardware. Low profile row unit covers offer an improvement in all situations but are most beneficial in the harvesting lodged, tangled or down corn. The low profile row unit cover reduces the angle of the inclined plane the mass of unattached tangled corn plants must overcome as they are moved from the row unit. The low profile row unit cover also minimizes the distance between the mass of unattached tangled corn plants and the gathering/conveying chain paddles. Engagement between the paddles and the corn plants for further powered movement is increased when the above distance is minimized. To implement the low profile row unit cover the required hardware was reduced in size and moved to the interior of the row unit cover. See FIG. 10.

To alleviate the problem of having the end dividers plug in down corn, the present invention incorporates an adjustable end divider curtain and telescoping tube assembly. As crop conditions change, the operator may adjust the end divider curtain to reduce the steepness of the end divider to reduce plugging of the stalks. If the conditions are so extreme as to require the removal of the adjustable end divider curtain, the telescoping tube serves as an end divider and provides for smooth continuous flow. See FIG. 11.

DETAILED DESCRIPTION OF THE INVENTION

Figure 11:
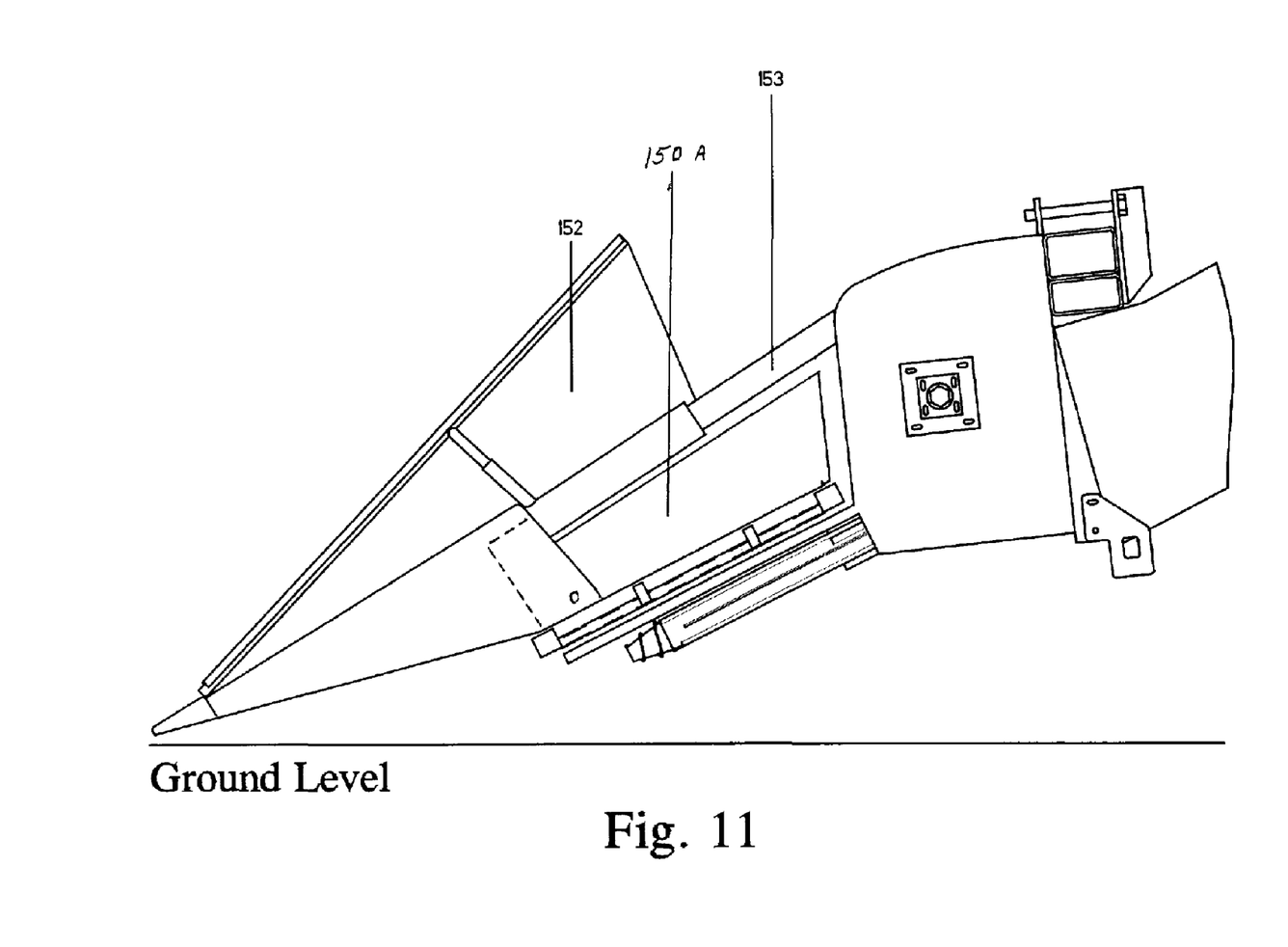
FIG. 11—is an end view of FIG. 4 incorporating the invention and components of pending patent application Ser. No. 09/827,563 (Strategic Spatial Realignment for Attaching Cornheads to Combines) and end row unit cover, improved end wing divider, and telescoping tube divider of this invention.

The operation of corn heads incorporating this invention in FIGS. 4 through 11 are similar to that of the operation of corn heads of the prior art as illustrated in FIGS. 1, 2, & 3. The power to drive this corn head row unit is provided from a main drive shaft through a gearbox as described in the prior art. In FIGS. 4, 5, & 11 the corn stalks are lifted and guided toward the row unit by dividers 100. In FIGS. 4A, 5, & 11 rotating gathering chain 120 contains enlarged gathering paddles 110 and directs the corn plants toward the ear separation chamber 140.

In FIGS. 4A & 6 the corn plants are further centered into the ear separation chamber 140 by improved stripper plates 130.

In FIG. 4A enlarged gathering chain paddles 110 have an increased angle relative to the gathering chain 120 which makes them more aggressive when gathering down corn plants.

In FIG. 5 when harvesting down corn some corn plants are severed or broken as the row dividers 100 and row unit cover 150 lift and separate tangled plants. In FIG. 10 the improved low profile row unit cover 150 has minimal rear height. The single largest plane that is contacted by crop material is shown by 155 in FIGS. 5 and 10. This height reduction is made possible by the unique mounting brackets 151 in FIG. 10. This reduction in height has two benefits: (1) It lessens the angle of inclined plane for which any dislodged material must overcome as it travels to the cross auger flighting 230 for conveyance. (2) It keeps this mass of material close to gathering chain paddles 110 for improved engagement.

In FIG. 7 the corn plants are gathered and further propelled rearwardly by means of the force imparted by rotating transport vanes 170, which are oppositely wound and strategically timed to be horizontally opposite. The transport vanes 170 positively direct and lock the corn stalk into revolving entry window 175. The strategic lateral speed imparted to the corn stalk by rotating transport vanes 170 is determined by the angle of the vanes. This lateral speed is equal to or faster than the lateral speed imparted to the corn stalk by gathering chain paddles 110.

As shown in FIGS. 5, 7, 8 and 11 stalk roll flutes of different lengths in a stair-stepped assembly create a revolving entry window or windows 175. This revolving entry window(s) 175 allows that as stalk rolls 190 rotate the next set of non-meshing flutes 180 which extend further engage with the perimeter of the corn stalk for initial pinching and downward pulling of the corn plant as described in FIG. 9. The remaining sets of non-meshing flutes further engage the corn stalk.

In FIG. 6 and view B-B of FIG. 8 the stripper plates 130 are flat in the Alignment and Entry Zones reducing ear wedging below stripper plates 130, and above the rotating transport vanes 170 of stalk roll 190 when ears are being gathered from near ground level.

In FIGS. 6, 7, 8 D-D, & 9 the Ear Separation Zone of the stripper plates 130 is normally directly above the fluted portion of stalk rolls 190 and is slightly curved down. Opposed flutes 182 are shown in the embodiment pictured herein (FIGS. 5-9). In FIG. 9 this curve emulates the arched portion or underside of the leaf 310. This improved curved shape allows smooth flow of unwanted portions of the corn plants to pass between stripper plates 130 and exit the ear separation chamber 140 while retaining the ear 300.

As shown in FIGS. 5, 7, 8, 9, & 11 rotating stalk rolls 190 are mounted in the preferred cantilevered manner for rotation by their respective stalk roll drive shaft, thereby eliminating support brackets or bearings.

In FIGS. 7, 8, & 9 the plurality of flutes of stalk rolls 190 are timed to be non-meshing and horizontally opposite of each other thereby causing the flute edges to pinch the stalk 320 simultaneously as they rotate, thus providing that the resultant equal forces are applied to both sides of the engaged stalk 320 so as to eliminate corn plant whip. This keeps the stalk 320 perpendicular and reduces any whipping action that prematurely dislodges the ear 300 from the corn stalk 320 or snaps the stalk at the node 330. The remaining flutes of stalk roll 190 then further pinch the corn stalk 320 pulling it down and rearwardly so that the ears of corn 300 are removed from the stalks 320 as they come into contact with the desired ear separation zone of stripper plates 130. As shown in FIG. 9 the stalks 320 are pinched and not broken which allows the stalk 320 to stay attached to its original root system, which is viewed in today's agriculture as being more environmentally friendly.

In view E-E of FIG. 8, a clean out zone is created by adding short lengths of tall meshing flutes 183 between non-meshing flutes 181. Using inter-meshing flutes allows faster ejection of small diameter corn stalks, normally found in this portion of the zone from the upper most portion of the corn plant. The fluted portion 183 of stalk roll 190 is aerodynamically designed and assembled to create a down draft through the ear separation chamber 140, which further enhances removal of any mote.

In FIGS. 4A and 5 the reduced number of enlarged gathering chain paddles 110 increases the conveying capacity of the ear separation chamber 140 to carry separated ears rearward. This improved capacity increases the conveying efficiency of the gathering chain paddles 110 to the cross auger trough 200 which contains auger 220 and flighting 230 for conveyance to the feeder house area.

In FIG. 11 adjustable end divider 152 and telescoping tube 153 are easily adjusted to changing crop conditions for improved crop dividing between corn head passes. The end row rear unit cover is shown by 150A.

Having described the preferred embodiment, other features of the present invention will undoubtedly occur to those versed in the art, as will numerous modifications and alterations in the embodiments of the invention illustrated, all of which may be achieved without departing from the spirit and scope of the invention.

The invention claimed is:

1. A stripper plate for use with a corn head row unit, said stripper plate comprising:
   a. a first portion, wherein said first portion is substantially flat along both the width and length of said first portion, wherein said first portion includes a first edge and a second edge connected by the width of said stripper plate, and wherein said first edge and said second edge are parallel to the longitudinal axis of a harvesting machine; and
   b. a second portion, wherein said second portion is integrally formed with said first portion such that a first edge of said second portion is collinear with said first edge of said first portion and such that said second portion is located behind said first portion, wherein a second edge of said second portion gradually slopes downward with respect to said second edge of said first portion along the width of said second portion by an increasing amount along the length of said stripper plate, wherein said second edge of said second portion is parallel to the longitudinal axis of said harvesting machine.

2. The stripper plate according to claim 1 wherein said stripper plate is further defined as being mounted adjacent a second stripper plate in such a manner that said stripper plate and said second stripper plate are configured as mirror images of one another about a vertical plane, and wherein the distance between said stripper plate and said second stripper plate is constant along the length of said stripper plate and said second stripper plate.

3. The stripper plate according to claim 1 wherein said stripper plate is further defined as being mounted on a corn head row unit, wherein at least one stalk roll is pivotally affixed to said corn head row unit above said stripper plate, wherein a plurality of flutes are affixed to the exterior of said at least one stalk roll, and wherein the length of said stripper plate is substantially equal to the length of said at least one stalk roll.

4. A stripper plate for use with a harvesting machine, said stripper plate comprising:
   a. a first edge extending the length of said stripper plate, wherein said first edge is linear along the entire length of said stripper plate, and wherein said first edge is parallel to the longitudinal axis of said harvesting machine; and
   b. a second edge separated from said first edge by the width of said stripper plate, wherein said second edge is substantially parallel to the longitudinal axis of said harvesting machine, wherein a first portion of said second edge is linear and at the same elevation as said first edge, and wherein a second portion of said second edge gradually slopes downward from said first edge.

5. A pair of stripper plates for use with a corn head row unit, said pair of stripper plates comprising:
   a. a first stripper plate comprising:
      i. a first portion, wherein said first portion is substantially flat along both the width and length of said first portion;
      ii. a second portion, wherein said second portion is integrally formed with said first portion, and wherein a first edge of said second portion gradually slopes downward along the width of said second portion by an increasing amount along the length of said first stripper plate;
   b. a second stripper plate mounted adjacent said first stripper plate in such a manner that said first stripper plate and said second stripper plate are configured as mirror images of one another about a vertical plane, and wherein the distance between said first stripper plate and said second stripper plate is constant along the length of said first and second stripper plates.

* * * * *